J. G. SHERIDAN.
POULTRY COOP.
APPLICATION FILED JUNE 12, 1920.
1,385,648.
Patented July 26, 1921.
2 SHEETS—SHEET 1.
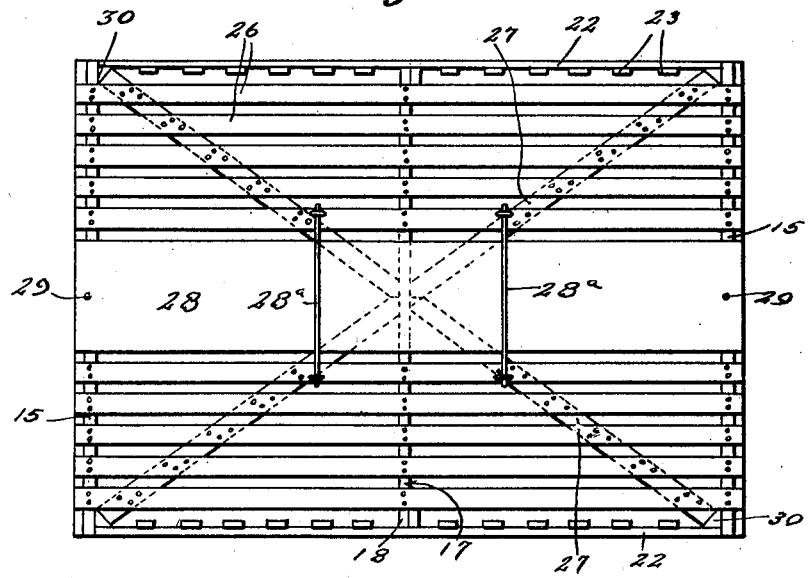
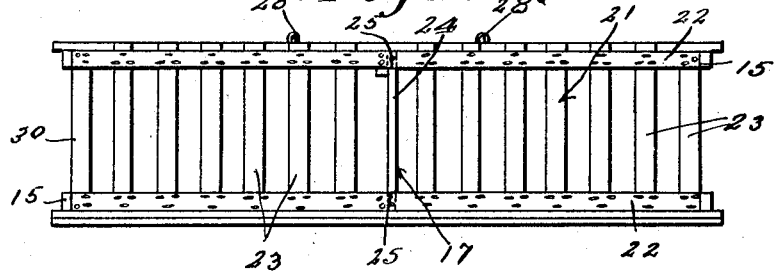
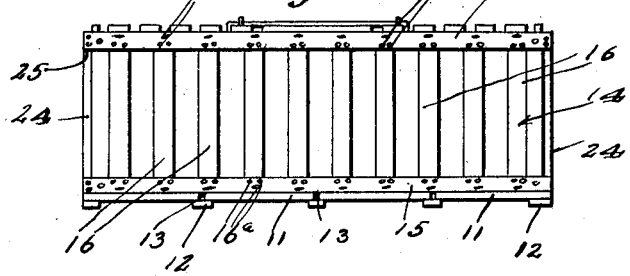

J. G. SHERIDAN.
POULTRY COOP.
APPLICATION FILED JUNE 12, 1920.

1,385,648.

Patented July 26, 1921.
2 SHEETS—SHEET 2.

R. A. Thomas
WITNESSES

J. G. Sheridan. INVENTOR
BY Victor J. Evans
ATTORNEY

UNITED STATES PATENT OFFICE.

JAMES G. SHERIDAN, OF PARNELL, IOWA.

POULTRY-COOP.

1,385,648.  Specification of Letters Patent.  Patented July 26, 1921.

Application filed June 12, 1920. Serial No. 388,572.

*To all whom it may concern:*

Be it known that I, JAMES G. SHERIDAN, a citizen of the United States, residing at Parnell, in the county of Iowa and State of Iowa, have invented new and useful Improvements in Poultry-Coops, of which the following is a specification.

This invention relates to shipping crates, particularly to crates for shipping poultry, and has for its object the provision of an extremely simply constructed, light, and easily assembled coop or crate for shipping poultry, the construction being such that the poultry may readily stick their heads through the sides and ends for feeding but cannot stick their heads through the top and be consequently injured by the superposing of other coops thereon.

Another object is the provision of a coop of this character which is so constructed that the poultry cannot stick their toes through the bottom, thus preventing injury thereto.

Another object is the provision of a coop of this character in which the ends and partition serve as supports for the cover and in which the cover serves as a brace for the sides, whereby the coop will be extremely strong and not likely to be crushed during transportation.

Another object is the provision of a coop of this character which may be used for keeping poultry on lawns in the city or country.

An additional object is the provision of a coop of this character which will be simple and inexpensive in manufacture, highly efficient and satisfactory in use, and a general improvement in the art.

With the above and other objects and advantages in view, the invention consists in the details of construction to be hereinafter more fully described and claimed, and illustrated in the accompanying drawings in which—

Figure 4:
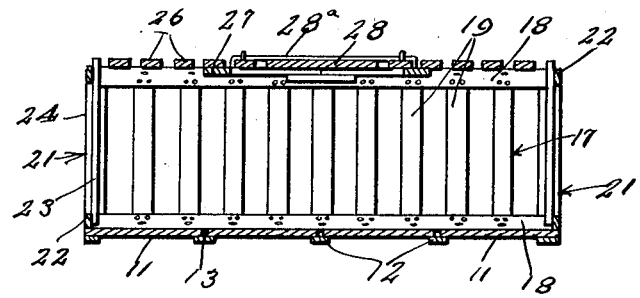
Figure 5:
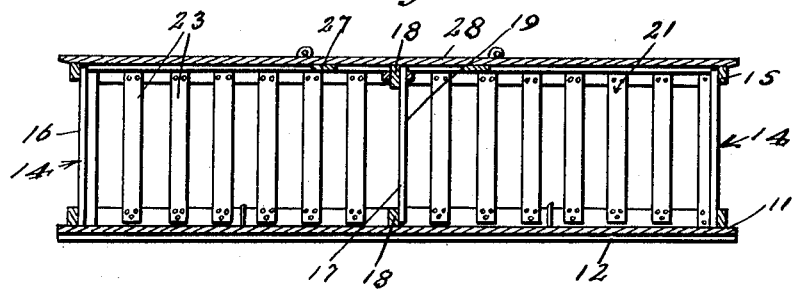
Figure 6:
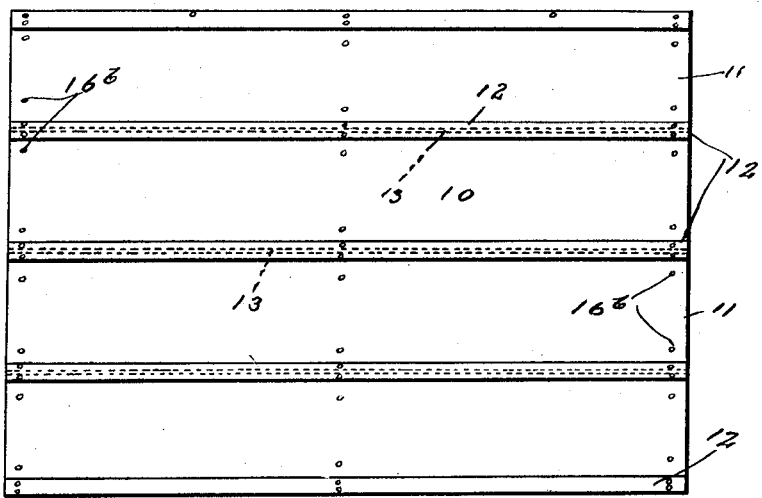

Figure 1 is a plan view,
Fig. 2 is a side elevation,
Fig. 3 is an end elevation,
Fig. 4 is a cross sectional view,
Fig. 5 is a longitudinal sectional view, and
Fig. 6 is a bottom plan view.

Referring more particularly to the drawings, I have shown the coop as comprising a bottom 10 which is formed of a plurality of longitudinally extending boards 11. Secured upon the undersides of the boards 11 and covering the cracks therebetween, are battens 12 upon which the coop may be slid. The boards 11 are spaced apart at their edges to provide channels 13 extending to the ends of the coop for the purpose of providing ventilation.

The coop also includes a pair of end members 14, each of which is formed of a pair of bars 15 which are connected by vertically disposed slats 16, nailed upon the inner sides of the bars 15, the nails 16$^a$ being clenched as shown. These end members are of course disposed at the ends of and upon the top of the bottom 10 and the lower bars 15 are secured to the bottom boards 11 by nails 16$^b$ which extend upwardly through the bottom and through the lower rails and are clenched.

I further make use of a partition 17 formed of upper and lower bars 18 connected by slats 19 nailed thereto and the nails clenched. This partition is disposed transversely of the bottom 10 at its center and is secured thereto by nails passing through the bottom and the lower bar and clenched. The end walls and partition are all of the same height.

The sides are designated by the numeral 21 and are similar in construction to the ends and partition, being formed of upper and lower horizontal bars 22 having slats 23 secured thereto by means of nails which are subsequently clenched, and these sides are of the same height as the ends and partition. At their centers, each side has a slat omitted, the end slats 24 of the partition performing the function of the slats omitted. The sides of the coop are secured upon the bottom 10 by nails driven upwardly through the bottom and having their upper ends clenched onto the tops of the bottom rails of the sides. The end slats 24 of the partition have their outer edges recessed for the reception of the bars of the sides and to define shoulders 25 engaging the bars and increasing the rigidity of the structure.

The cover of the coop comprises longitudinally extending slats 26 which are placed so close together that the poultry cannot stick their heads therebetween. The slats 26 are nailed to the bars 15 and 18 of the ends and the partition. This cover is braced by diagonal brace members 27 nailed to the slats 26 and which extend from the corners and the cover has the central slats omitted to define an opening closed by a sliding door 28 movable beneath a wire guide 28ᵃ and held normally in closed position by one or more nails 29.

In order that the sides may be properly connected with the ends, each corner of the coop is provided with a triangular corner post 30 to which the upper and lower bars of the sides and ends are nailed when the coop is assembled. By making the posts triangular in cross section, a considerable saving in material is effected. The ends of the diagonal braces 27 engage against the posts 30 for strengthening the structure.

The coop is designed to be manufactured and shipped to the purchaser in a knockdown condition ready for subsequent assembly. After assembly the coop is designed to remain in set-up condition.

When the coop is assembled it will be seen that the cover will rest upon and be supported by the ends and partition. With the coop thus assembled, it will be seen that the poultry may stick their heads through the spaces between the vertical slats at the sides and ends for feeding and it will also be noted that there are no braces of any kind upon the sides and ends which would interfere with proper feeding. It will also be observed that poultry cannot stick their feet through the bottom and that danger of tearing off their toes or nails is consequently prevented. As the slats in the top are very close together it will be seen that the poultry cannot stick their heads through, an advantageous feature, as injury might otherwise result when another coop is superposed. It will be observed that at all times there is ample ventilation and that the poultry may be consequently kept in a thoroughly healthy condition during shipment, so that loss from death will be reduced to the minimum. The coop is very light so that transportation charges will be small.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A shipping coop for poultry comprising a bottom, end walls secured upon the bottom, a partition secured upon the bottom at the transverse center thereof, said partition and end walls being all of the same height and being formed of top and bottom bars and vertical slats secured upon the inner faces thereof, corner posts triangular in cross section to which the bars of the ends are secured, side members secured upon the edges of the bottom and connected at their ends with said corner posts, said side members being formed of upper and lower bars and vertical slats secured thereto, and a cover secured upon said end and partition members, said cover being formed of slats and being provided with openings closed by a movable door, and diagonal braces secured to the cover and abutting against said posts.

2. A shipping coop for poultry comprising a bottom, end walls secured upon the bottom, a partition secured upon the bottom at the transverse center thereof, said partition and end walls being all of the same height and being formed of top and bottom bars and vertical slats secured upon the inner faces thereof, corner posts triangular in cross section to which the bars of the ends are secured, side members secured upon the edges of the bottom and connected at their ends with said corner posts, said side members being formed of upper and lower bars and vertical slats secured thereto, and a cover secured upon said end and partition members, said cover being formed of slats and being provided with openings closed by a movable door, and diagonal braces secured to the cover and abutting against said post, the end-most slats of the partition having their outer edges recessed for the reception of the upper and lower bars of the sides whereby to define supporting shoulders.

In testimony whereof I affix my signature.

JAMES G. SHERIDAN.